United States Patent
Laughlin

(10) Patent No.: US 7,839,490 B2
(45) Date of Patent: Nov. 23, 2010

(54) SINGLE-APERTURE PASSIVE RANGEFINDER AND METHOD OF DETERMINING A RANGE

(76) Inventor: Richard H. Laughlin, 2100 Dove Loop Rd., Lot 41, Grapevine, TX (US) 76051

( * ) Notice: Subject to any disclaimer, the term of this patent is extended or adjusted under 35 U.S.C. 154(b) by 5 days.

(21) Appl. No.: 11/833,808

(22) Filed: Aug. 3, 2007

(65) Prior Publication Data
US 2009/0003654 A1 Jan. 1, 2009

Related U.S. Application Data

(63) Continuation-in-part of application No. 11/771,182, filed on Jun. 29, 2007, now abandoned.

(51) Int. Cl.
*G01C 3/08* (2006.01)
(52) U.S. Cl. ............... 356/3.13; 356/3.01; 356/3.1; 356/3.15; 356/4.01; 356/5.01
(58) Field of Classification Search ....... 356/3.01–28.5, 356/139.01–139.1
See application file for complete search history.

(56) References Cited

U.S. PATENT DOCUMENTS

| | | | |
|---|---|---|---|
| 5,373,318 A * | 12/1994 | Harriman | 348/117 |
| 2005/0273259 A1* | 12/2005 | Qwarfort et al. | 701/301 |
| 2007/0008515 A1* | 1/2007 | Otani et al. | 356/5.02 |

* cited by examiner

*Primary Examiner*—Thomas H Tarcza
*Assistant Examiner*—Luke D Ratcliffe

(57) ABSTRACT

A single-aperture passive rangefinder and a method of determining a range. In one embodiment, the single-aperture passive rangefinder includes: (1) an imaging system configured to form a first image that includes a point of interest at a first position and a second image at a second position that includes the point of interest and (2) a processor associated with the imaging system and configured to acquire and store the first image and the second image and determine a range to the point of interest based on a separation between the first position and the second position and a position of the point of interest relative to virtual axes of the imaging system at the first position and at the second position.

29 Claims, 10 Drawing Sheets

SINGLE-APERTURE PASSIVE RANGEFINDER AND METHOD OF DETERMINING A RANGE

CROSS-REFERENCE TO RELATED APPLICATION

This Application is a continuation in part of U.S. patent application Ser. No. 11/771,182, filed Jun. 29, 2007 now abandoned, entitled "Imaging Triangulation Rangefinder and Method of Determining a Range," commonly owned with the invention and incorporated herein by reference.

TECHNICAL FIELD OF THE INVENTION

The invention is directed, in general to a rangefinder and more specifically, to a rangefinder and method for determining a range to a target of interest by image triangulation using passive single-aperture imaging.

BACKGROUND OF THE INVENTION

With the increasing threat of countermeasures and detection of active (e.g., laser) rangefinders and the emphasis on stealth, a requirement exists for passive rangefinders.

Prior art military devices have typically used laser rangefinders to determine a range. Laser rangefinders have the disadvantage that they are active devices. Their emitted radiation may be detected. This detection may not only give away the soldier's position, it may also result in countermeasures, including return fire.

There are also a number of parallax systems used to determine range where two images are formed at fixed opposing angles and the length of a baseline is adjusted to determine range. Still other systems use the blur of the image to determine the offset from the focal point to estimate the range. None of these techniques are entirely satisfactory.

Accordingly, what is needed in the art is a better rangefinder and a better way to determine a range to a target point, namely a passive rangefinder or passive way to determine a range to a target point.

SUMMARY OF THE INVENTION

To address the above-discussed deficiencies of the prior art, one aspect of the invention provides a single-aperture passive rangefinder. In one embodiment, the single-aperture passive rangefinder includes: (1) an imaging system configured to form a first image that includes a point of interest at a first position and a second image at a second position that includes the point of interest and (2) a processor associated with the imaging system and configured to acquire and store the first image and the second image and determine a range to the point of interest based on a separation between the first position and the second position and a position of the point of interest relative to virtual axes of the imaging system at the first position and at the second position.

In another aspect, the invention provides a single-aperture passive rangefinder kit. In one embodiment, the single-aperture passive rangefinder kit includes: (1) a bracket configured to mate with an imaging system at first and second positions thereon to provide a fixed spacing with respect thereto and allow the imaging system to form a first image that includes a point of interest at a first position and a second image at a second position that includes the point of interest and (2) a processor configured to acquire and store the first image and the second image and determine a range to the point of interest based on a separation between the first position and the second position and a position of the point of interest relative to virtual axes of the imaging system at the first position and at the second position.

In yet another aspect, the invention provides a method of determining a range to a point of interest. In one embodiment, the method includes: (1) forming a first image that includes the point of interest at a first position, (2) storing the first image, (3) forming a second image at a second position that includes the point of interest, (4) storing the second image and (5) determining a range to the point of interest based on a separation between the first position and the second position and a position of the point of interest relative to virtual axes of the imaging system at the first position and at the second position.

The foregoing has outlined certain aspects and embodiments of the invention so that those skilled in the art may better understand the detailed description of the invention that follows. Additional features of the invention will be described hereinafter that form the subject of the claims of the invention. Those skilled in the art should appreciate that they may readily use the disclosed conception and specific embodiment as a basis for designing or modifying other structures for carrying out the same purposes of the invention. Those skilled in the art should also realize that such equivalent constructions do not depart from the scope of the invention.

BRIEF DESCRIPTION OF THE DRAWINGS

For a more complete understanding of the invention, reference is now made to the following descriptions taken in conjunction with the accompanying drawings, in which.

DETAILED DESCRIPTION

Before describing the various embodiments of the invention that are illustrated herein, it is useful to understand the basic concept of range determination upon which the various embodiments are based. It is akin to one of the ways a person visually determines range, which is fundamentally a triangulation process involving the brain and a person's eyes. The brain identifies the object or targeted point and the eyes focus thereon. As used herein, the term "target point" or "targeted point" refers to an object or point within an area of interest to which a range or distance may be calculated or determined using the embodiments described herein. The brain then computes the angle from each eye to the targeted point and, using this information, performs a triangulation computation and solves the range equation. Unfortunately, because the distance separation between a person's eyes is small, the range calculation may not be very accurate. This is one reason the brain relies on other information, such as the size of a targeted object relative to known size information about such object or the size of the targeted object relative to other, non-targeted objects, to determine range. Certain embodiments of the invention carry out a triangulation process a person may carry out when he or she determines range without resorting to other clues. Certain embodiments of the invention essentially substitute an imaging system, in two positions for the eyes and a processor, such as a digital signal processor (DSP), for the brain. The embodiments thus provide a significant advantage over the human eye as far as range determination is concerned. The principal advantage is that the space between the two imaging systems may be increased with a resultant advantageous increase in range resolution.

Certain embodiments of the invention may easily and economically be incorporated into situations where an imaging system in already in use for purposes of object acquisition and identification. Certain embodiments of the invention also have an advantage over active, (e.g., laser-based) rangefinding systems in that it does not have to be precisely aimed or aligned. It is a passive device, because it can identify a targeted object and then determine a range to it without illuminating it with electromagnetic energy. Instead, it works by analyzing images taken of the targeted object on a frame-by-frame basis. In most cases where a rangefinder such as that described herein would be needed, an active system to detect and classify observed objects is most probably already in use.

Figure 1:
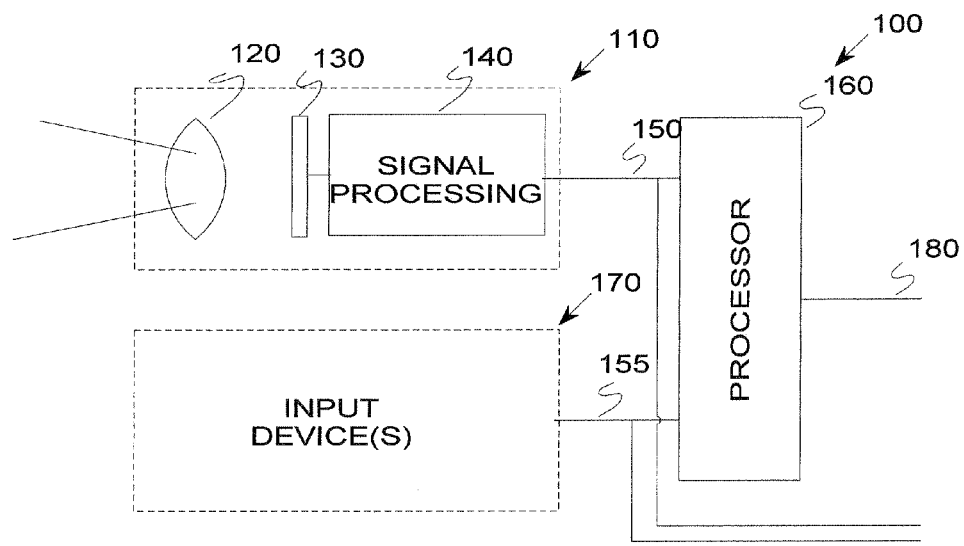
FIG. 1 illustrates a block diagram of one embodiment of a single-aperture passive rangefinder constructed in accordance with the principles of the invention.

Referring initially to FIG. 1, illustrated is a block diagram of one embodiment of a single-aperture passive rangefinder 100 constructed in accordance with the principles of the invention. As noted above, certain embodiments provide a passive rangefinding function by using images derived from a single imaging system 110. The single imaging system 110 includes an image forming lens 120 configured to form an image of the scene on the imaging detector 130. The imaging detector 130 is configured to convert the image into a video signal, which is then processed in a manner to be described in greater detail below by the signal processing electronics 140. The signal processing electronics 140 are configured to provide a processed video signal 150 to a processor 160. The video signal 150 may be analog video and digitized at the processor 160 or may originate in digital format. The processor 160 also receives input data from one or more input devices 170. The input data may include data grab position 1 positional data, data grab position 2 positional data and orientation data (not shown).

Figure 2:
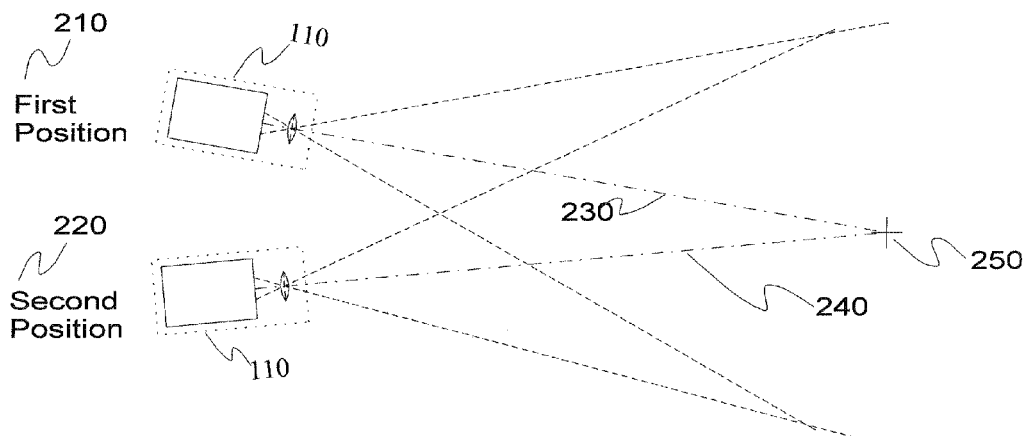
FIG. 2 illustrates the application of another embodiment of a single-aperture passive rangefinder constructed in accordance with the principles of the invention.

FIG. 2 illustrates the imaging system 110 viewing the same target point from two known but separate positions, a first position 210 and a second position 220. To perform the range calculations using triangulation principles, both the relative positions (the "separation") of the imaging system 110 and the relative orientation of the optical axis (hereinafter described) of the imaging system 110 at each position are required. In one embodiment, the imaging system 110, is moved about one meter with respect to the center of the lens 120. Of course, any spacing between the two positions of the imaging system may be used and fall within the scope of the invention. To calculate range, a DSP uses the optical axis information relative to the target point as well as the relative positions of the imaging system 110 and derives the range using the principles of triangulation. In one of the embodiments the separation is measured or estimated and manually entered, while the azimuth angle is obtained from an internal sensor.

The grab data function at the first position 210 and the second position 220 may be automated or manually activated. The physical position may be manually entered or acquired from other positional sensors. In one embodiment, the orientation may be manually entered or acquired from other sensors. In another embodiment, both the separation between the first position 210 and the second position 220 are automatically obtained from sensors, and the angular orientations are obtained from sensors. In the illustrated embodiment, the separations are obtained from accelerometers, and the heading, roll and pitch are obtained from a magnetic sensor configured to sense the earth's magnetic field.

As FIG. 2 illustrates, the imaging system 110 in the first position 210 and the imaging system 110 in the second position 220 have a known spatial relationship to each other physically as well as known relative relationship of their optical axes. The illustrated embodiment uses the known relationship of the imaging system 110 in the first position 210 to the imaging system 110 in the second position 220 from both a physical perspective as well as an optical perspective to perform the necessary range calculations. Images are derived from video signals taken from the first position 210 and the second position 220. These video signals are in the video signal 150 of FIG. 1. The video signals may originate in an analog format and then be digitized in the processor 160 of FIG. 1 or may alternatively originate in a digital format. The processor 160 receives the video signal at the first position 210 and stores the image along with positional and orientation information. The imaging system 110 is then moved to the second position 220. Although not necessary, this motion may be substantially normal to the optical axis. The processor 160 then receives the video signal at the second position 220 and stores the image along with the positional and orientation information. The processor 160 may provide its output as digital data 180 including the range to the target point. The processor 160 may also provide video images generated by two separate imaging systems 110. Advantageously, the processor 160 may be located at the same site as the single-aperture passive rangefinder 100 or it located at a point that is remote from the single-aperture passive rangefinder 100.

Those skilled in the pertinent art will understand that various type of imaging systems 110 may be used and be within the scope of the invention. The imaging system 110 may cover the spectral range from ultraviolet to sonic, including, without limitation, the visual region as well as infrared and millimeter wave. Those skilled in the pertinent art will also understand that suitable imaging systems may take many forms without departing from the scope of the invention. This includes thermal imagers or infrared cameras, charge-coupled device (CCD)-based cameras, including electron multiplying CCD cameras, complementary metal-oxide semiconductor (CMOS) and vidicon-based cameras. The embodiments illustrated herein assume the use of a CCD-based camera in the imaging system 110.

Figure 3:
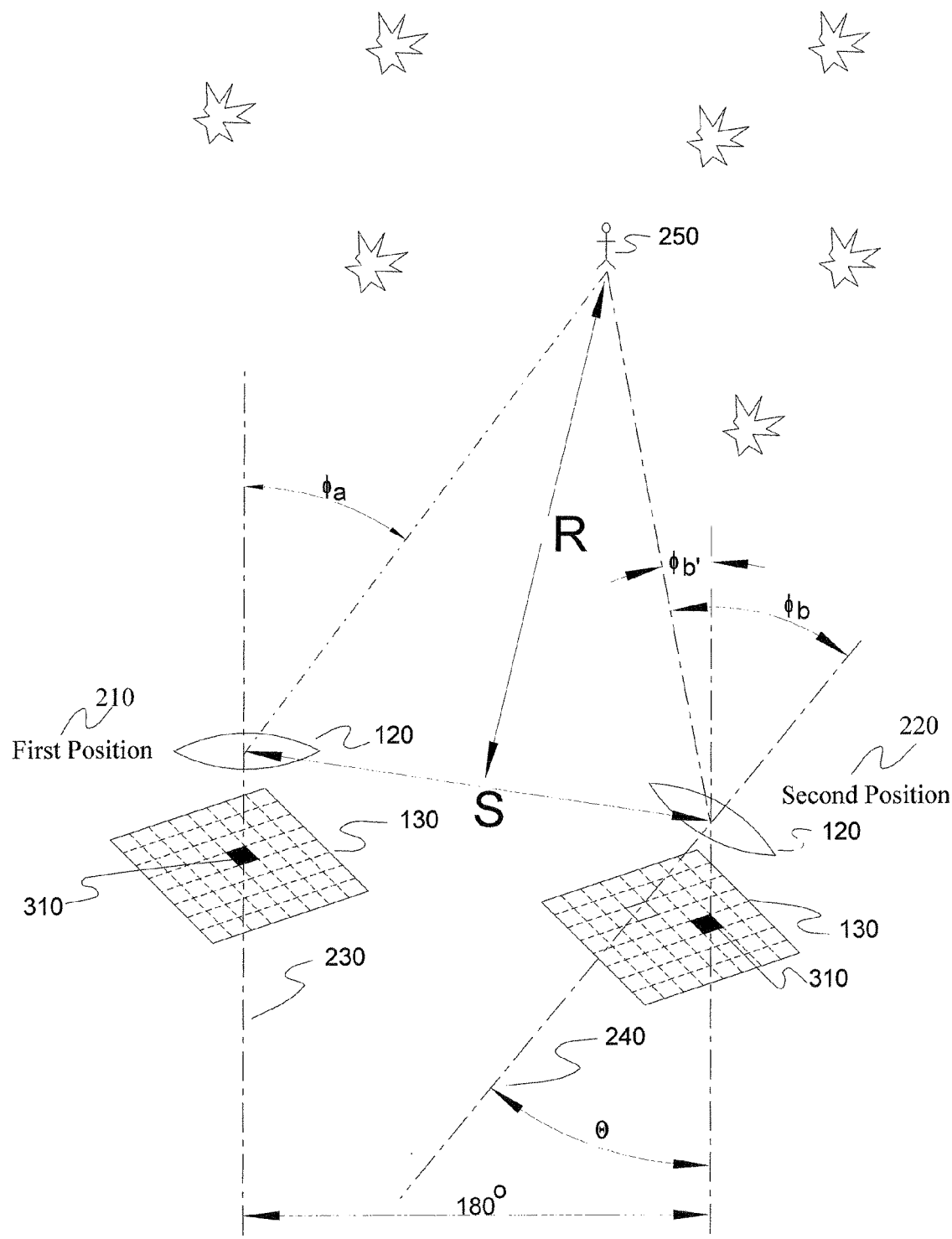
FIG. 3 illustrates a geometric diagram representing variables in equations to be solved to calculate range to a target point.

Turning now to FIG. 3, illustrated is an example of how one embodiment of a single-aperture passive rangefinder 100, constructed in accordance with the principles of the invention determines the range to a target point 250 based on a known relationship of the first position 210 of the imaging system 110 to the second position 220 of the imaging system 110 and the relative relationship of optical axes 230, 240, in each position and to the target point 250. The imaging system 110, in the first and second positions 210, 220 may be mounted at any spacing or orientation and be within the scope of the invention as long as the target point is in the mutual field of view. In certain embodiments, such as that illustrated in FIG. 2, the imaging system 110 in its first position 210 and its associated optical axis 230 are orientated at an arbitrary but known angle Θ with respect to the optical axis 240 of the imaging system 110 in its second position 220. This relationship is illustrated in FIG. 3, where an optical axis 230 of the first imaging system 110, in its first position relative to the optical axis 240 of the single-aperture passive rangefinder 100 in its second position 220 forms the angle Θ. The imaging system 110 in its first position 210 is spaced a distance S from the imaging system 110 in its second position 220. The target point 250 is located so that it has an angle $\phi_a$ from the optical axis 230 and is also at an angle $\phi_b$ from the optical axis 240. Those skilled in the pertinent art will understand that the magnitude of the angle $\phi_a$ to the target point is the arctangent of the angle $\phi_a$. This is equivalent to the displacement on the imaging array or detector 130 of FIG. 1 from the axis of the target point 250 divided by the focal length of the lens of the imaging system 110. The same is true with respect to the angle $\phi_b$.

The axes 230, 240 of the imaging system 110 are registered on a reference pixel 310 of a pixilated image plane 130. The first image of the target point 250 is focused on the image plane 130 and the pixel containing the image of the target point 250 is determined. The same thing is done with respect to the second image. The arctangent of the displacement of the pixel containing the image of the point of interest, from the reference pixel 310, divided by the focal length of the lens of the imaging system 110 corresponds to the respective first and second angle $\phi_a$, $\phi_b$ of the first and second positions 210, 220.

Once the target point 250 is identified in the image taken from the second position 220, a region of interest containing the image of the target point 250 is extracted and correlated with the image taken from the first position 210. The coordinates of the target point 250 [ax ay] in the image taken from the first position 210 and the coordinates of the target point 250 [bx by] in the image taken from the second position 210 are obtained and used to determine the respective magnitudes of the angles to the target point 250. These data along with the relative position of the second imaging system 115 to the first imaging system 110 are used by the processor 160 to determine a range to the target point 250.

Figure 4:
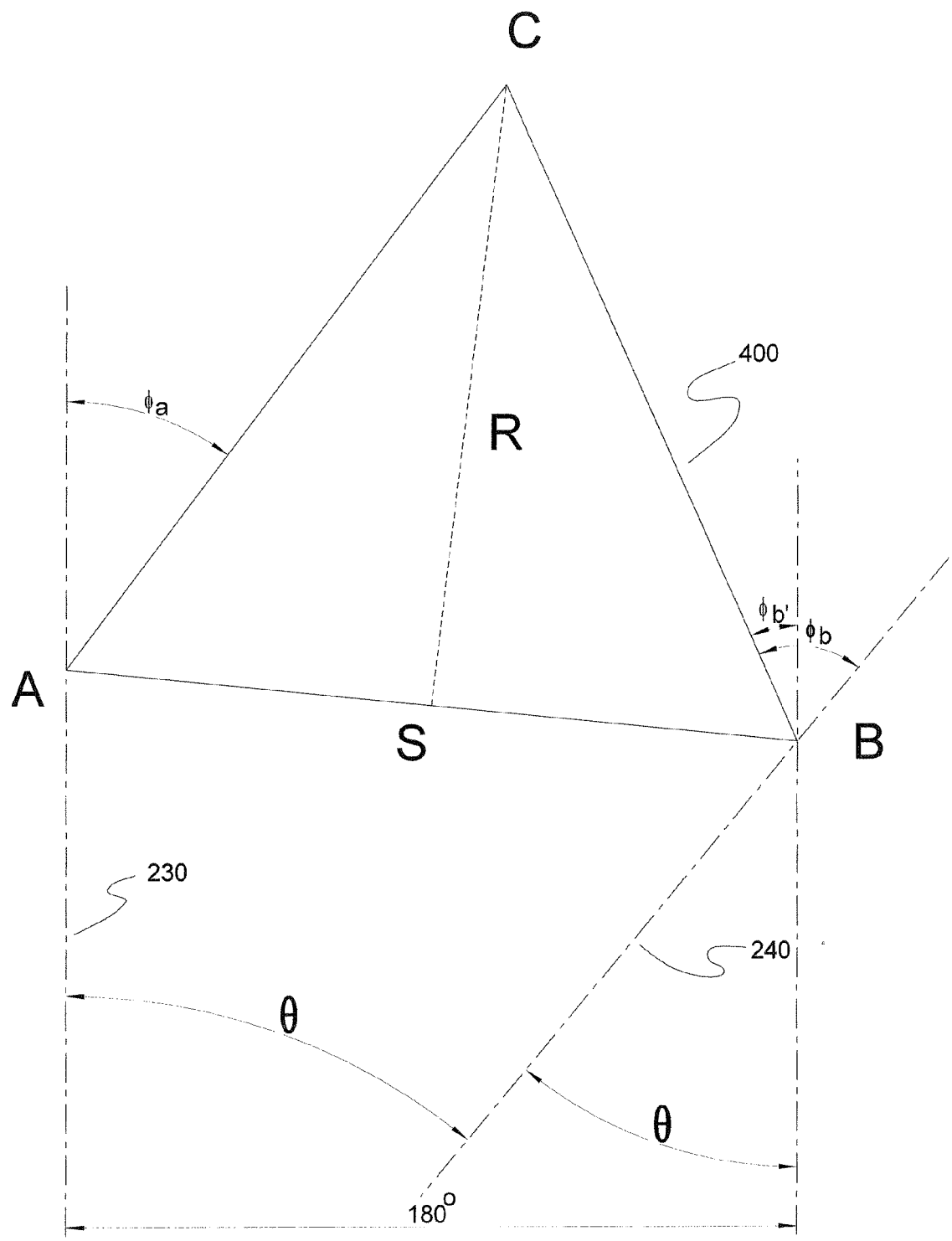
FIG. 4 illustrates a more simplified version of the geometric diagram of FIG. 3.

Turning now to FIG. 4 and with continuing reference to FIG. 3, illustrated is an example of the geometry used to calculate a range R to a target point 250. The imaging system 110, while at the first position 210, is located at a vertex A of a triangle 400. The imaging system 110, while at the second position 220, is located at a vertex B of the triangle 400. The target point 250 is located at a vertex C of the triangle 400. The optical axes 230, 240 form an angle Θ with one another. The target point 250 forms an angle $\phi_a$ with respect to the optical axis 230, and an angle $\phi_b$ with respect to the optical axis 240. An angle $\phi'_b$ represents the angle of the target point 250 with respect to the optical axis 230. This is defined by the equation $\phi'_b = \phi_b - \Theta$).

The range R to the target point 250 is approximated by the equation $R = S/(\phi_a - \phi_b + \Theta)$, where S equals the separation between the imaging system 110 at the first position 210 and the imaging system 110 at the second position 220, measured, in the illustrated embodiment, from the point where the optical axis 230 passes through the lens 120 of the imaging system 110 at the first position 210 and the optical axis 240 passes through the lens 120 of the imaging system 110 at the second position 220. The angle φ equals the arctangent (the displacement of the target point 250 on the imaging array or detector 130 from a reference point, divided by the focal length of the lens 110). In one embodiment, the reference point is defined by the intersection of the optical axis 210 with the imaging array or detector 130.

The range equation may also be rewritten as: R=S/(# pixels*k1-# pixels*k2+k3). In this equation, k1 equals the conversion from the number of displacing pixels on the imaging array or detector 130 from the reference point of the object of interest to the displacement/lens 120 focal length, and k2 equals the conversion from the number displacing pixels on the imaging array or detector 135 from the reference point of the object of interest to the displacement/lens 120 focal length. Constant k3 equals the conversion of Θ as a constant in the same dimensional units.

Those skilled in the pertinent art will recognize that the determination of the two angles $\phi'_b$ and $\phi_a$ also determine the angle subtended by each of the imaging system 110 at the first and second positions 210, 220 to the target point 250 at vertex C. This is defined by the trigonometric identity: $\phi_{ab} = 180° - \phi_a - \phi_b$.

Figure 5:
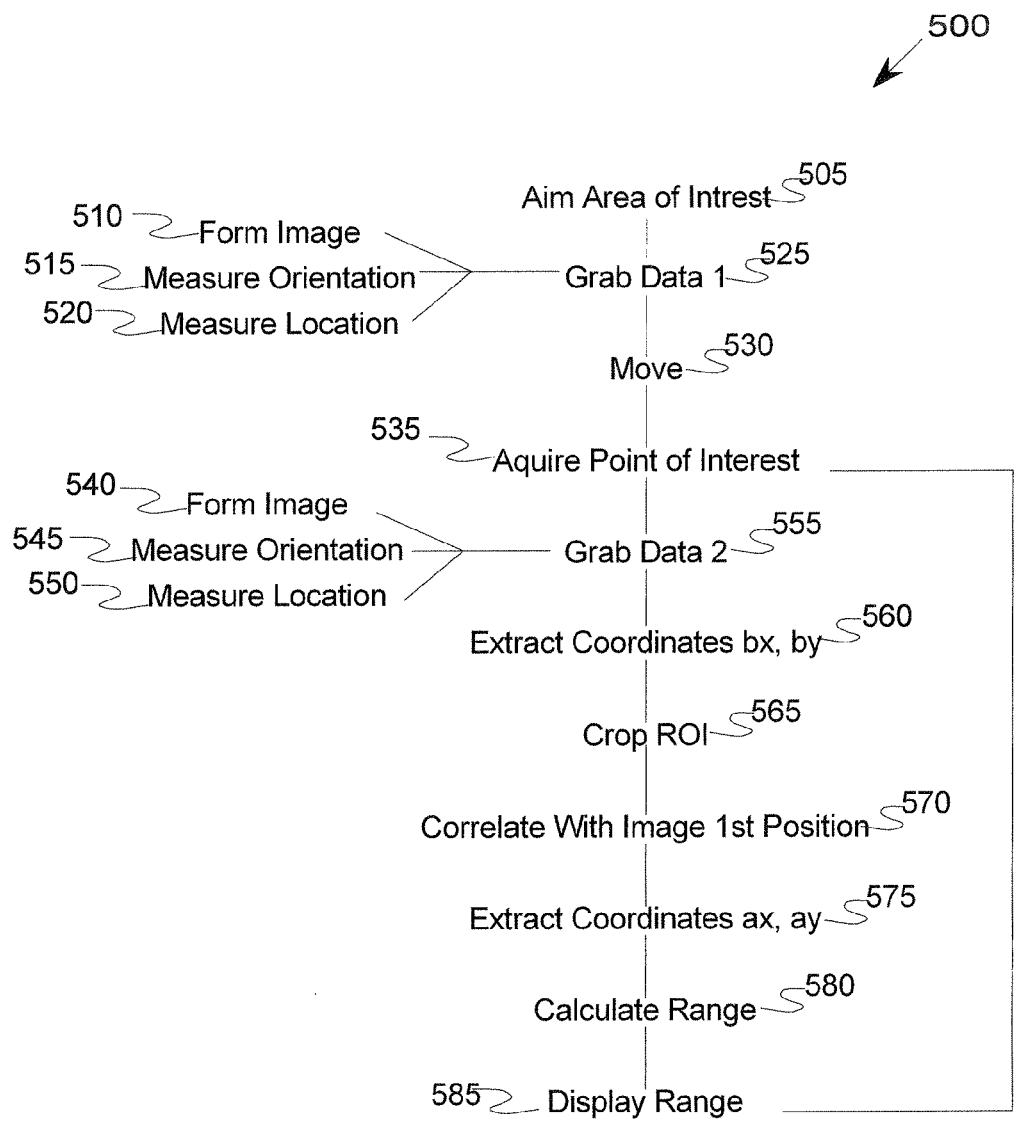
FIG. 5 illustrates the operation of a single-aperture passive rangefinder used in accordance with the principles of the invention.

Turning now to FIG. 5, illustrated is a flow diagram 500 of the operation of the single-aperture passive rangefinder 100 of FIG. 1 in determining a range to a targeted point of interest. An operator places the imaging system at a first position and aims it at an area of interest in a step 505. The imaging system forms an image in a step 510 and transmits it as video signal. The orientation of the imaging system is measured in a step 515, and the position of the imaging system is measured in a step 520. In the illustrated embodiment, the step 515 is carried out by a magnetic sensor that measures the earth's magnetic flux, and the step 520 is carried out by an accelerometer. The steps 510, 515, 520 are collectively referred to as a grab data 1 step 525. The first position is referenced as zero. Upon carrying out the grab data 1 step 525, the image from video signal, the orientation and the position are stored in memory.

In a step 530, the operator moves the imaging system to a second position and again aims it at the area of interest in a step 535. In the illustrated embodiment, the second position is substantially normal to the axis of the imaging system. The imaging system forms an image 8 at the second position in a step 540, and the orientation and position of the imaging system is measured in steps 545 and 550, respectively. The steps 540, 545, 550 are collectively referred to as a grab data 2 step 555. Upon carrying out the grab data 2 step 555, the image, the orientation and the position are stored in memory. The coordinates of the point of interest (bx) are extracted from the image in a step 560, and the image is cropped to a region of interest in a step 565. The region of interest from the second position is correlated with the image from the first position to identify the point of interest from the image in the first position in a step 570. The coordinates ax, ay are then extracted in a step 575. The orientation from the first position that was measured in the step 515 and the orientation from the second position that was measured in the step 545 are used to determine the relative orientation Θ between the axis of the imaging system in the first position and the axis of the imaging system in the second position 220. In like manner, the position from the first position that was measured in the step 520 and the position from the second position that was measured in the step 550 are used to determine the separation S between the first and second positions. Using the separation S, the included angle Θ and the angles $\phi_a$ and $\phi'_b$, the range R is calculated in a step 580 and displayed in a step 585.

At this point, the operator may move the imaging system to a new position or acquire the range to a new point of interest by returning to the step 535. In another embodiment, the steps 565, 570 may be eliminated by designating the point of interest manually in the step 505 rather than just pointing in the general area.

Figure 6:
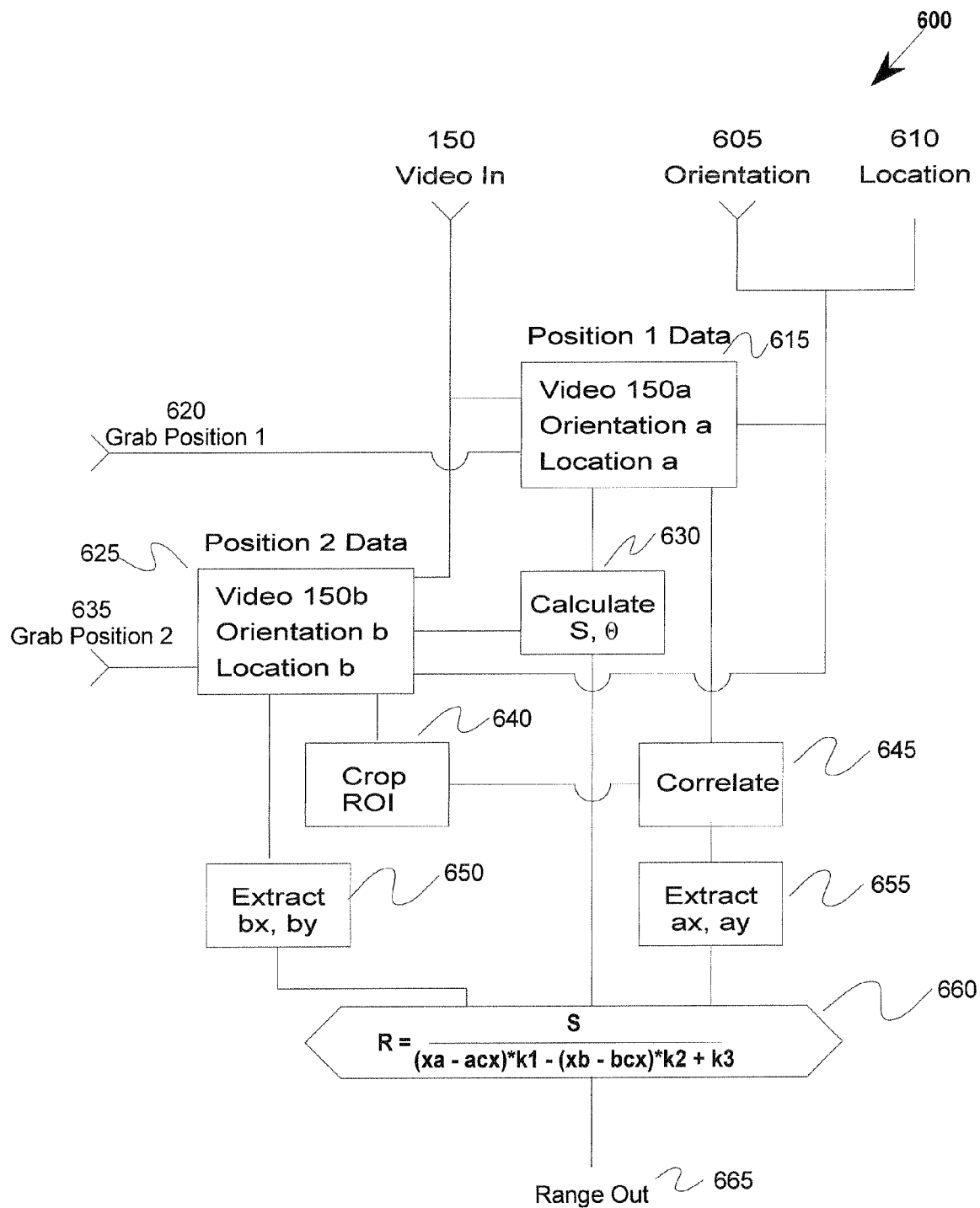
FIG. 6 illustrates one embodiment of the operation of the processor of the single-aperture passive rangefinder of FIGS. 1 and 2.

Turning now to FIG. 6, illustrated is one embodiment of the operation of the processor of the single-aperture passive rangefinder 100 of FIGS. 1 and 2. An input video signal 150 is provided to the processor. The video signal 150 includes an image taken at a first position (designated video 150a) contained in position 1 data 615 during a grab position 1 operation 620 and an image taken at a second position (designated video 150b) contained in position 2 data 625 during a grab position 2 operation 635. Orientation data 605 are also provided to the processor. The orientation data include an orientation a contained in the position 1 data 615 and an orientation b contained in the position 2 data 625 as shown. Position data 610 are also provided to the processor. The position data include a position a obtained contained in the position 1 data 615 and a position b contained in the position 2 data 625 as shown. The orientation data 605 and position data 610 may come from a plurality of sources ranging from manual entry to autonomous systems such as the well-known Global Position System (GPS). In the illustrated embodiment, the orientation data 605 (which provides the angle Θ between the optical axes) are derived from a three-axis magnetic compass, and the position data (which provides the separation S) are derived from an accelerometer. In another embodiment, the position data are derived from a scale measurement between the first position and the second position, and the measurement is then manually entered.

When the point of interest or region of interest at the first position, the grab position 1 operation 620 is performed, and the current frame of the video signal 150 is stored along with the current orientation 151 and position 152 data in memory. In one embodiment, the orientation a and position a are entered manually. In another embodiment, the grab position 1 operation 620 is an automated function. An example of an automated function would be when the imaging system was pointed in the same direction for a specific period of time.

When the imaging system is moved to the second position and the point of interest is identified the grab position 2 operation 635 is activated. In the illustrated embodiment, the point of interest is identified by placing the reticle on the point of interest. Upon activation of the grab position 2 operation 635, the current frame of video signal 150 is stored in memory, along with orientation b and position b. Orientations a and b and positions a and b are, in a step 620, taken into account to calculate the separation S between the first and second positions and the angle Θ between the optical axes of the imaging system in the first and second positions.

The coordinates bx, by are extracted from the image in the video signal at the second position in a step 650 and, in the illustrated embodiment, the region of interest (ROI) is cropped from the image in the video signal in a step 640. In an alternative embodiment, the image in the video signal is not cropped, resulting in the step 640 being bypassed.

The cropped or uncropped ROI from the image taken from the second position is correlated with the image taken from the first position in a step 645. The coordinates of the point of interest ax, ay are extracted from the correlation data in a step 655. In another embodiment, the coordinates ax, ay, bx and by are selected by an operator with no correlation. One example includes placing a reticle in the first position and the second position on the point of interest.

Using the values calculated and extracted in the steps 630, 650 and 655, the processor calculates the range in a step 660. The range is then provided in a step 665.

Figure 7:
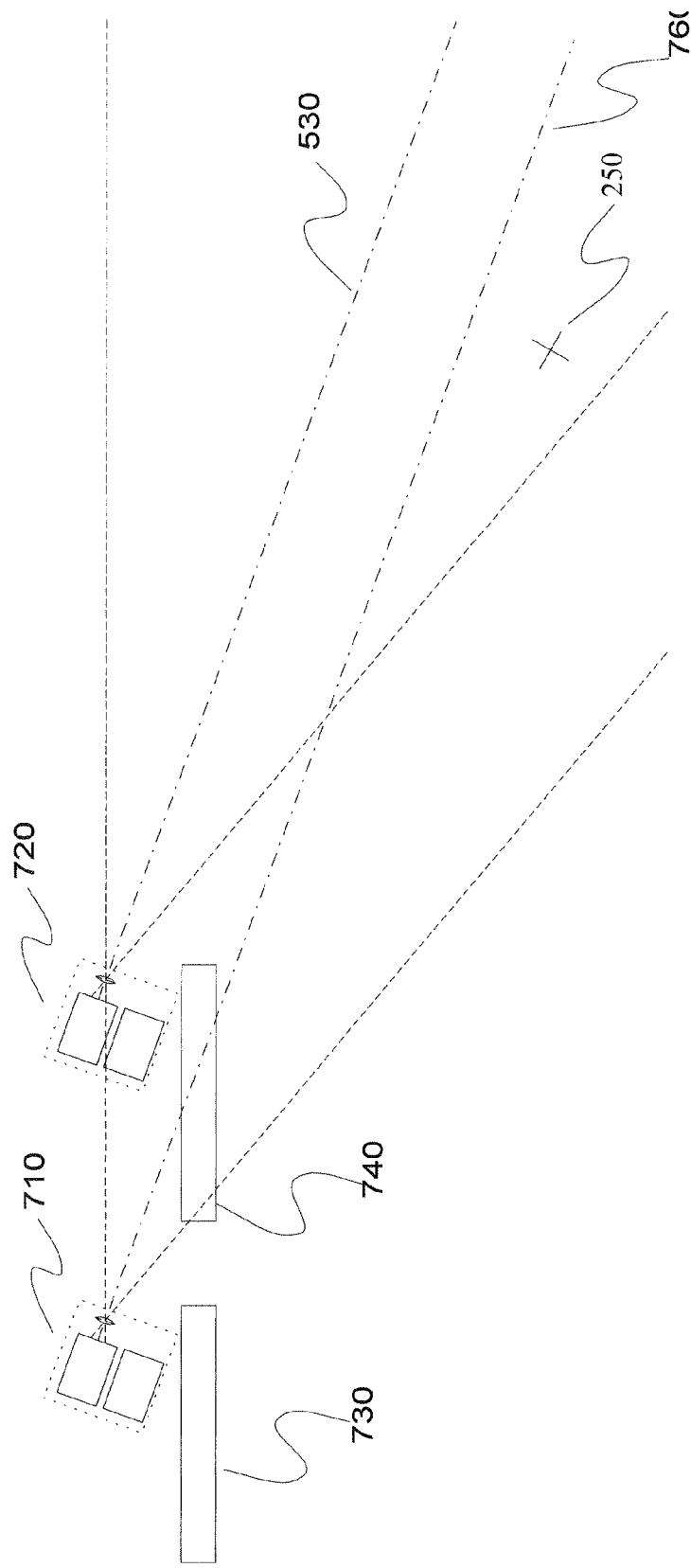
FIG. 7 illustrated is one embodiment of a single-aperture passive rangefinder associated with a moving platform and constructed in accordance with the principles of the invention.

Turning now to FIG. 7, illustrated is an embodiment of a single-aperture passive rangefinder constructed in accordance with the invention that is associated with a moving platform. The imaging system of the single-aperture passive rangefinder, the moving platform and corresponding axes for the imaging system are respectively referenced 710, 730 and 750 in a first position and 720, 740 and 760 in a second position. In this embodiment, the motion of the platform 730, 740 is used to define a plurality of separations between positions. In one embodiment the platform 730, 740 is an aircraft. As will be recognized by those skilled in the pertinent art, any vehicle in motion would be a suitable platform 730, 740. In one embodiment, the position X, Y, Z is augmented by integrating the vehicles velocity and performing a double integration on the vehicles acceleration.

Figure 8:
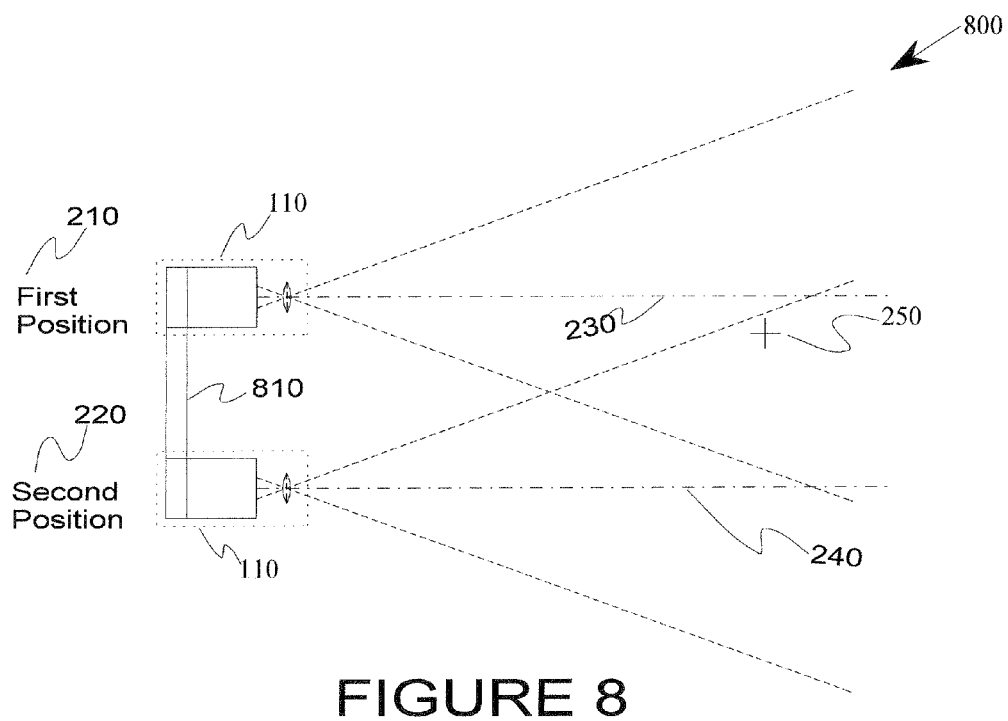
FIG. 8 illustrates an embodiment of a single-aperture passive rangefinder kit employing a bracket that provides a fixed orientation and spacing.

Turning now to FIG. 8, illustrated is an embodiment of a single-aperture passive rangefinder kit. The kit is intended for use by an operator who already has an imaging system (e.g., a camera) on-hand. The kit includes a processor (i.e., the hardware and software for computing range based on images) and a bracket 810, to which the operator's camera may be coupled, that provides a fixed orientation and spacing. As a result, no need for a position or orientation sensor exists.

Figure 9:
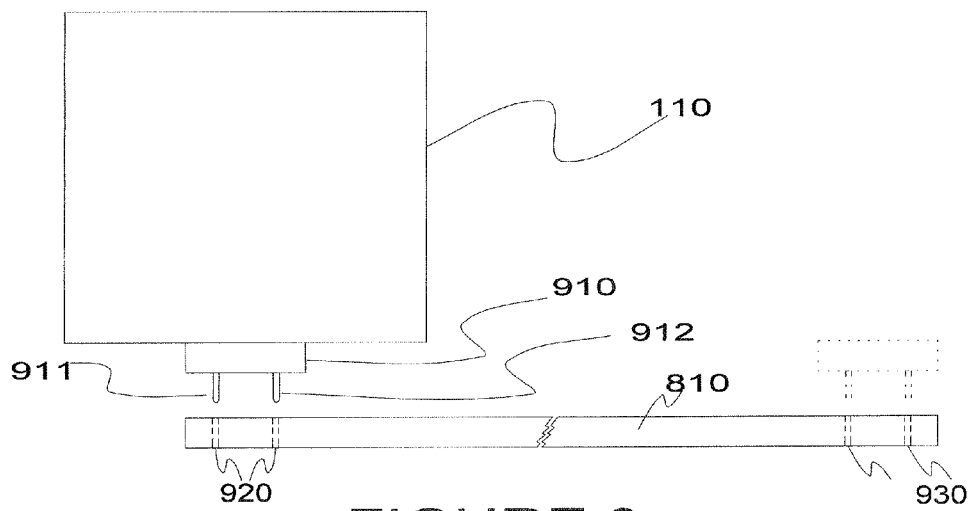
FIG. 9 illustrates a diagram of the bracket of FIG. 8.

FIG. 9 illustrates a diagram of the bracket 810 of FIG. 8. The bracket 810 is located at some fixed position with a fixed orientation. The imaging system 110 has a mount 910 attached thereto. Registration pins 911, 912 extend from the mount 910 and engage with a first set of corresponding pin-receiving holes 920 defining a first position with respect to the bracket 810. A second set of corresponding pin-receiving holes 930 defines a second position with respect to the bracket 810. A known separation S lies between the first and second sets of corresponding pin-receiving holes 920, 930. Further, the first and second sets of corresponding pin-receiving holes 920, 930 fixes the angle Θ at an arbitrary magnitude, e.g., 180°. A person skilled in the relevant art will understand that several different types of apparatus could be used to precisely mount and align the imaging system 110, such as dovetails, clamps and so on, all of which are within the scope of the invention. It is this precise mounting that provides a known separation S between the axes 230, 240 of FIG. 8 of the imaging system 110 in the first and second positions 210, 220. Although the embodiment illustrated in FIGS. 8 and 9 shows the axes 230, 240 to be substantially parallel, the invention encompasses embodiments in which the axes 230, 240 are not parallel at the positions where the images are formed.

While in the first position, the imaging system 110 captures and stores a first image. The imaging system 110 is then moved to the second position and a second image is captured and stored. Further processing takes place as described above, with the understanding that S and Θ are now known and need not be determined by other means.

Figure 10:
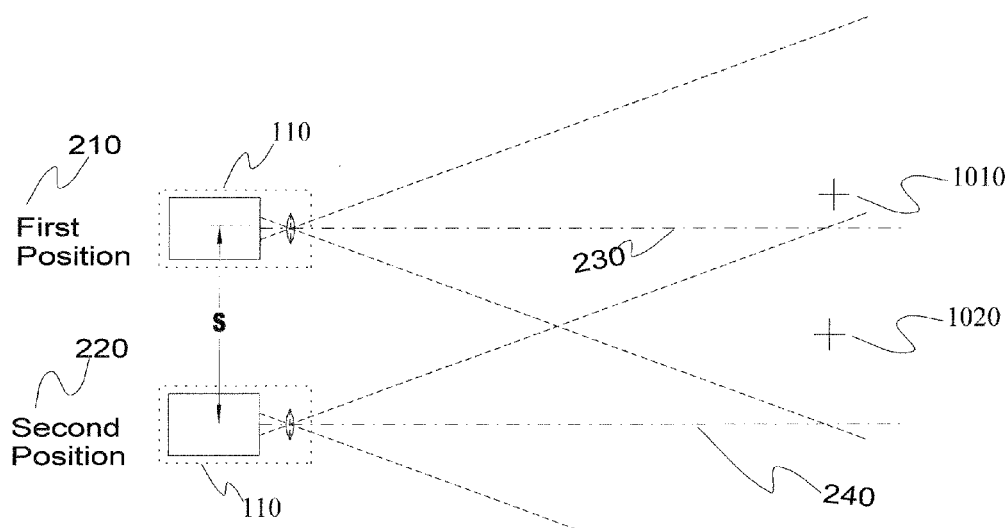
FIG. 10 illustrates a block diagram of an embodiment of a single-aperture passive rangefinder kit capable of operating without an orientation input and constructed in accordance with the principles of the invention.
Figure 11:
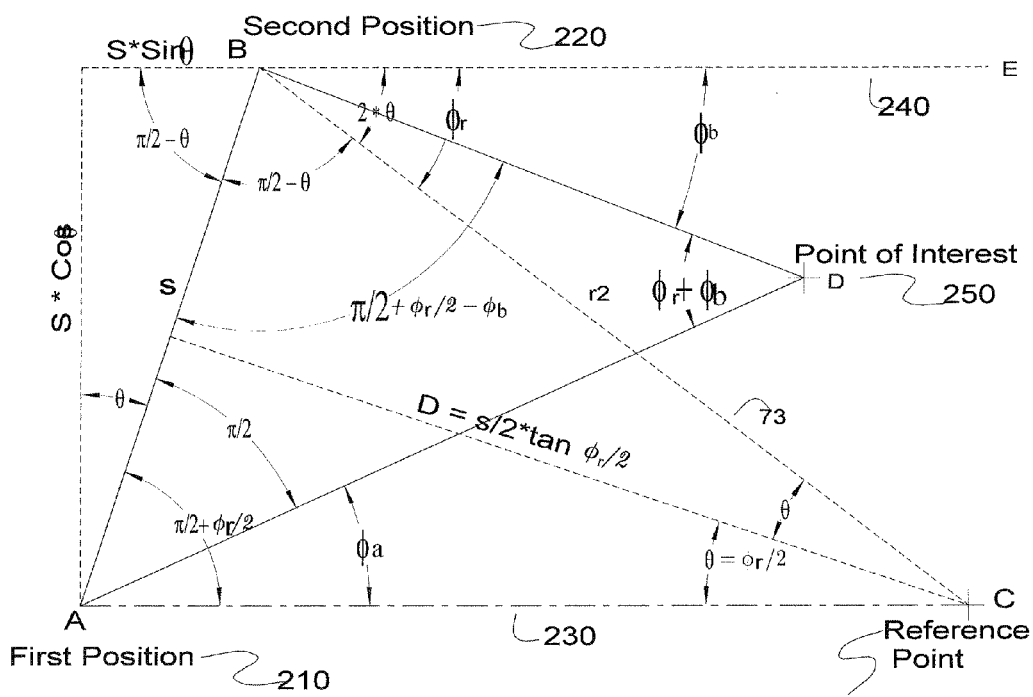
FIG. 11 illustrates a geometric diagram representing variables in equations to be solved to calculate the orientation of the single-aperture passive rangefinder of FIG. 10.

FIG. 10 illustrates an embodiment of a single-aperture passive rangefinder kit where only the separation S of image capture is known in advance. This separation S may either be measured or estimated. FIG. 11 illustrates a geometric diagram representing variables in equations to be solved to calculate the orientation of the single-aperture passive rangefinder of FIG. 10. As in FIG. 8, an image is captured in the first and second positions 210, 220 a reference point 1010 is selected and the range to the point of interest 250 is estimated or measured.

The reference point 1010 is selected in both the first and second image. In the illustrated embodiment the operator selects the reference point 1010 and correlation is used to select the same reference point 1010 in the second image. It will be recognized by one skilled in the pertinent art that the reference point may be selected by any number of methods. Using the geometry shown in FIG. 11, the included angle Θ is determined from the separation S and the angles $\phi_a$ and $\phi_r$.

Figure 12:
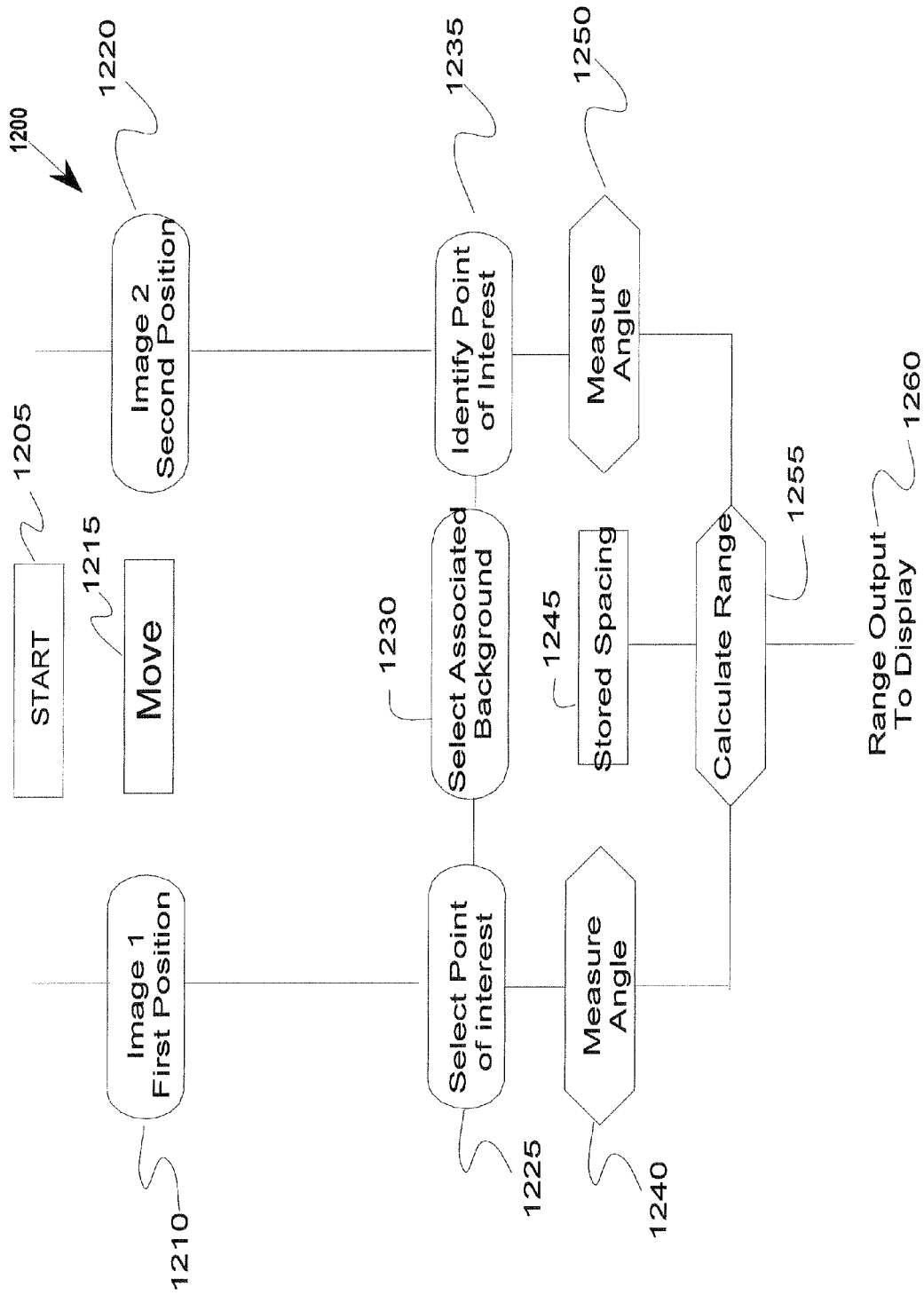
FIG. 12 illustrates a block diagram of certain processing elements of the single-aperture passive rangefinder of FIG. 10.

Turning now to FIG. 12, illustrated is a block diagram of one embodiment of a process 1200 to determine range to a point of interest using a single-aperture passive rangefinder. The process commences with a start step 1205. In an acquire first image step 1210, the imaging system forms the first image at the first position and stores it. The imaging system is then moved in a move step 1215 to the second position and the second image is acquired and stored in an acquire second image step 1220. In one embodiment the imaging system is attached to a processor, and the first image and second image are processed in real-time. In another embodiment, the first image and the second image are stored temporarily and later transferred to a processor for processing.

After the processor receives the stored images, the point of interest in the first image is selected in a select point of interest step 1225. In one embodiment, the point of interest is selected by a codec. In another embodiment, the point of interest is pre-selected. In still another embodiment, pluralities of point of interests are pre-selected. In yet still another embodiment, the point of interest or plurality of point of interests are selected by an operator. In a select associated background step 1230, the point of interest and the relevant associated background are designated as an image block. This image block is then correlated with the second image to identify the same point of interest in the second image in an identify point of interest in second image step 1235. Of course, the point of interest in the second image may also be selected by an operator or any other method and still be within the scope of the invention.

The output of the selected point of interest from the first image is then converted to an angle measured from the virtual axis of the imaging system while in the first position in a measure angle in first image step 1240. The output of the selected point of interest from the second image is then converted to an angle measured from the virtual axis of the imaging system while in the second position in a measure angle in second image step 1250. This information together with the stored spacing information (a step 1245) of the imaging system and virtual axis information is combined in a mathematical equation to determine the range to the point of interest in a calculate range step 1255. The process concludes with an end step 1260.

Figure 13:
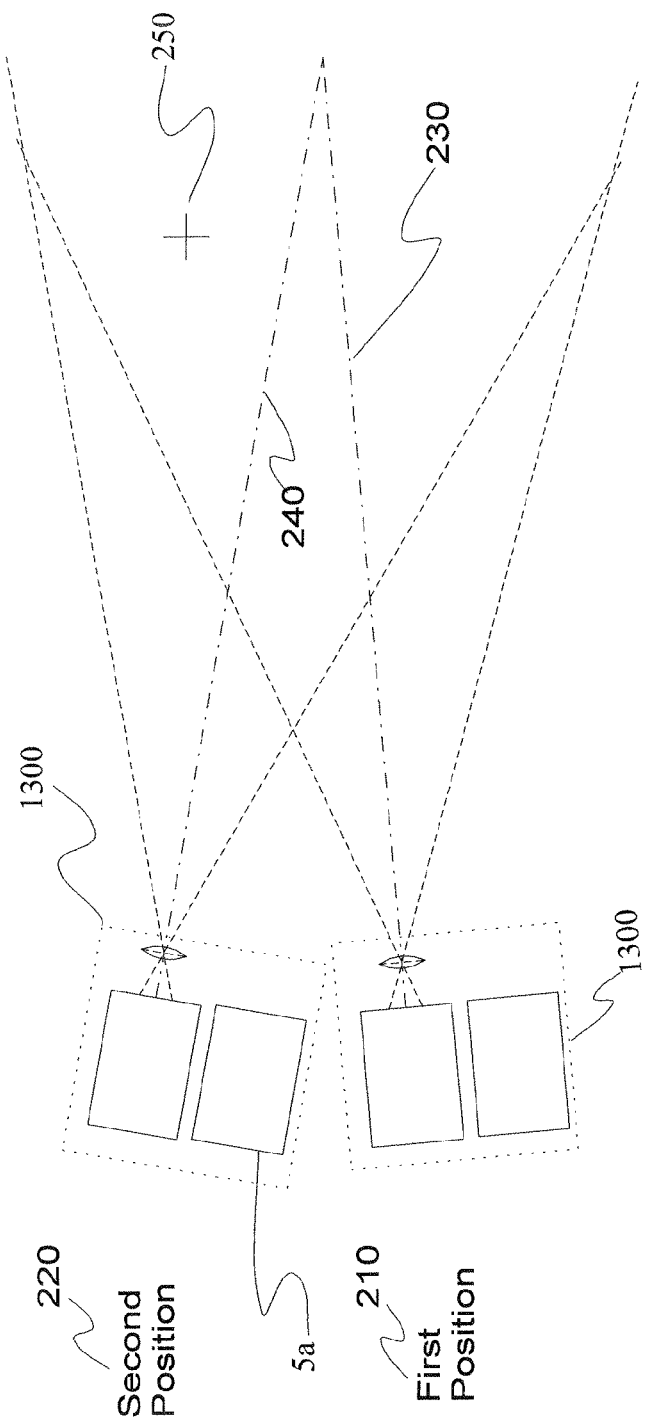
FIG. 13 illustrates a further embodiment of a single-aperture passive rangefinder constructed in accordance with the principles of the invention.

Turning now to FIG. 13, illustrated is another configuration of a single-aperture passive rangefinder 1200 constructed in accordance the invention. In this configuration, the single-aperture passive rangefinder includes an imaging system 110 that is augmented with one or more sensors 1310. The sensors 1310 may include angle data, coordinate data and/or tilt data sensors.

The one or more sensors 1310 may be connected to the processor by an input. In one embodiment the input is a keyboard for an operator to input angle data. In another embodiment, a cable transmits input from the one or more sensors 1310 to the processor. In still another embodiment, a wireless link transmits input from the one or more sensors 1310 to the processor. Those skilled in the pertinent art will recognize that a number of ways and methods exist to enter and transmit input data, all of which are within the scope of the invention.

If an angle sensor is present, it may measure the first angle $\Theta_1$ of the virtual axes 230 from, e.g., north in the first position 210 and store it. It may then measure the second angle $\Theta_2$ of the virtual axes 240 from, e.g., north in the second position 220 and store it. The orientation angle Θ is then the difference of the first and second angles, viz., $\Theta=\Theta_1-\Theta_2$.

If a coordinate sensor is present, it may determine the coordinates of the imaging system 110. In one embodiment, GPS output in terms of latitude, longitude and elevation are provided to the processor. In another embodiment, data is derived from a map, data table, or file. In yet another embodiment, data is input from a previous range file. Those skilled in the pertinent art will recognize that a number of ways and methods exist to obtain and enter latitude, longitude and elevation, including estimations. In one embodiment, the coordinate data $X_1, Y_1, Z_1$ are provided and stored with the first image. The imaging system 110 is then moved to a second position 220 and coordinate data $X_2, Y_2, Z_2$ is provided and stored. The separation S then is determined by the equation:

$$S=[(X_1-X_2)^2+(Y_1-Y_2)^2+(Z_1-Z_2)^2]^{1/2}$$

If a tilt sensor is present, it may measure the angle of the plane of the single-aperture passive rangefinder, as defined by the virtual axes 230, 240 in the first position 210 and in the second position 220, from a horizontal plane as defined by gravity, which may be the gravity of the earth. Using tilt data, the single-aperture passive rangefinder may convert the range, azimuth and elevation of the point of interest 250 to a true position, which may be displayed or transmitted.

Given all of the above descriptions and embodiments, those skilled in the pertinent art should see that the invention further provides a way to generate a three-dimensional (3-D) image with a single imaging system. The various embodiments described above employ a single imaging system to produce first and second two-dimensional images taken from separate first and second positions. After determining the range to a target of interest, the processor may combine the range data from the first and second images with one or more of the first and second images to produce a 3-D image in a manner that those skilled in the pertinent art well understand.

Those skilled in the art to which the invention relates will appreciate that other and further additions, deletions, substitutions and modifications may be made to the described embodiments without departing from the scope of the invention.

What is claimed is:

1. A single-aperture passive rangefinder, comprising:
   a single imaging system configured to form a first image that includes a point of interest at a first position and a second image at a second position that includes said point of interest; and
   a processor associated with said imaging system and configured to acquire and store said first image and said second image and determine a range to said point of interest based on a fixed separation between said first position and said second position and a fixed position of said point of interest relative to virtual axes of said imaging system at said first position and at said second position;

wherein said first position is about the same distance to said point of interest as said second position.

2. The single-aperture passive rangefinder as recited in claim 1 wherein said point of interest is designated in said first image by aligning a first reference marker therewith.

3. The single-aperture passive rangefinder as recited in claim 1 wherein said point of interest is designated in said second image by aligning a second reference marker therewith.

4. The single-aperture passive rangefinder as recited in claim 1 wherein said processor determines said range in part by correlating correlate said point of interest and its associated background in said first image with said point of interest and its associated background in said second image.

5. The single-aperture passive rangefinder as recited in claim 1 wherein an operator designates said point of interest in said first image.

6. The single-aperture passive rangefinder as recited in claim 1 wherein an operator designates said point of interest in said second image.

7. The single-aperture passive rangefinder as recited in claim 1 further comprising a target identification codec associated with said processor and configured to designate said point of interest in said first image.

8. The single-aperture passive rangefinder as recited in claim 1 further comprising a target identification codec associated with said processor and configured to designate said point of interest in said second image.

9. The single-aperture passive rangefinder as recited in claim 1 wherein said imaging system comprises a camera selected from the group consisting of:
an infrared camera,
a digital camera, and
video camera.

10. The single-aperture passive rangefinder as recited in claim 1 wherein said processor is further configured to combine data regarding said range with at least one the first and second images to produce a 3-D image.

11. A single-aperture passive rangefinder kit, comprising:
a precision spacer configured to mate with an imaging system at first and second positions thereon to provide a fixed spacing and angular orientation with respect thereto and allow said imaging system to form a first image that includes a point of interest at a first position and a second image at a second position that includes said point of interest; and
a processor configured to acquire and store said first image and said second image and determine a range to said point of interest based on a separation between said first position and said second position and a position of said point of interest relative to virtual axes of said imaging system at said first position and at said second position;
wherein said precision spacer is in a same position relative to said point of interest for both said first and second positions.

12. The single-aperture passive rangefinder kit as recited in claim 11 wherein said precision spacer is configured to mate with said imaging system at said first and second positions thereon further to provide a fixed orientation with respect thereto.

13. The single-aperture passive rangefinder kit as recited in claim 11 wherein said point of interest is designated in said first image by aligning a first reference marker therewith.

14. The single-aperture passive rangefinder kit as recited in claim 11 wherein said point of interest is designated in said second image by aligning a second reference marker therewith.

15. The single-aperture passive rangefinder kit as recited in claim 11 wherein said processor determines said range in part by correlating correlate said point of interest and its associated background in said first image with said point of interest and its associated background in said second image.

16. The single-aperture passive rangefinder kit as recited in claim 11 wherein an operator designates said point of interest in said first image.

17. The single-aperture passive rangefinder kit as recited in claim 11 wherein an operator designates said point of interest in said second image.

18. The single-aperture passive rangefinder kit as recited in claim 11 further comprising a target identification codec associated with said processor and configured to designate said point of interest in said first image.

19. The single-aperture passive rangefinder kit as recited in claim 11 further comprising a target identification codec associated with said processor and configured to designate said point of interest in said second image.

20. The single-aperture passive rangefinder kit as recited in claim 11 wherein said processor is further configured to combine data regarding said range with at least one the first and second images to produce a 3-D image.

21. A method of determining a range to a point of interest, comprising:
forming a first image that includes said point of interest at a first position;
storing said first image;
forming a second image at a second position that includes said point of interest;
storing said second image; and
determining a range to said point of interest based on a separation between said first position and said second position and a position of said point of interest relative to virtual axes of said imaging system at said first position and at said second position, wherein said first position is about the same distance to said point of interest as said second position.

22. The method as recited in claim 21 further comprising designating said point of interest in said first image by aligning a first reference marker therewith.

23. The method as recited in claim 21 further comprising designating said point of interest in said second image by aligning a second reference marker therewith.

24. The method as recited in claim 21 wherein said determining comprises correlating correlate said point of interest and its associated background in said first image with said point of interest and its associated background in said second image.

25. The method as recited in claim 21 further comprising designating said point of interest in said first image, said designating carried out by an operator.

26. The method as recited in claim 21 further comprising designating said point of interest in said second image, said designating carried out by an operator.

27. The method as recited in claim 21 further comprising designating said point of interest in said first image, said designating carried out by a target identification codec.

28. The method as recited in claim 21 further comprising designating said point of interest in said second image, said designating carried out by a target identification codec.

29. The method as recited in claim 21 further comprising combining data regarding said range with at least one the first and second images to produce a 3-D image.

* * * * *